Jan. 12, 1971  LE ROY R. BOGGS  3,554,589
SHAFT ALIGNMENT COUPLING
Filed May 23, 1969
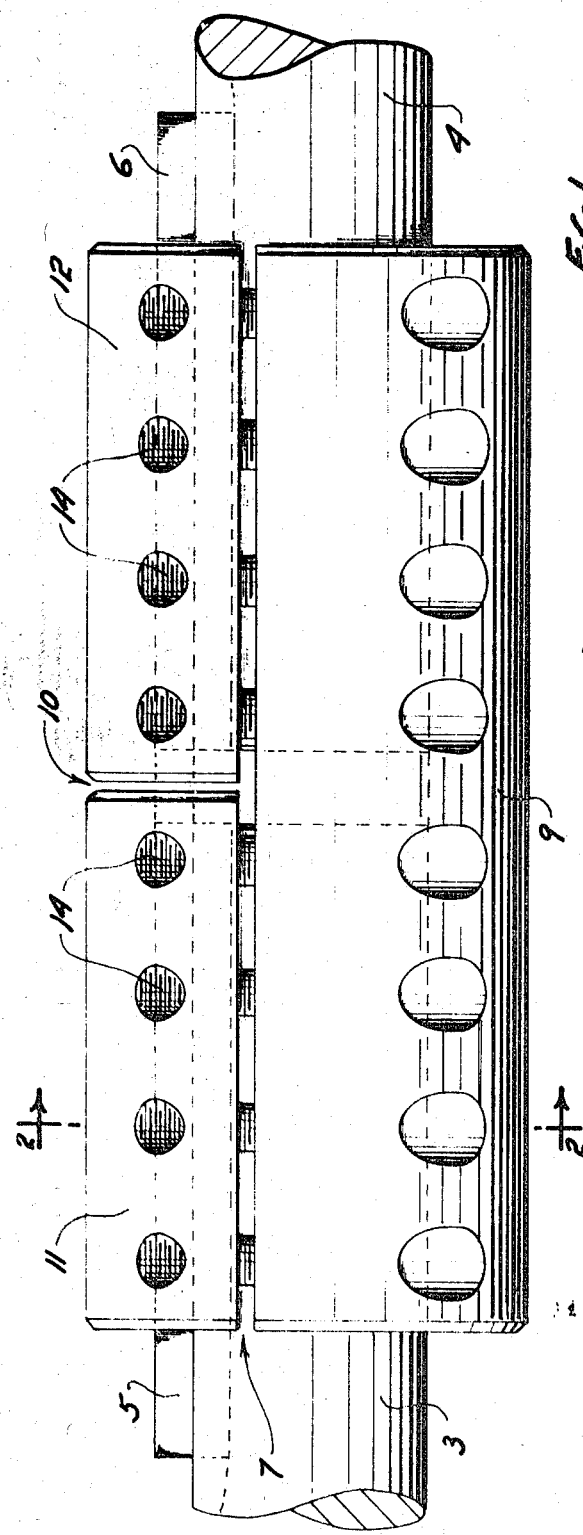
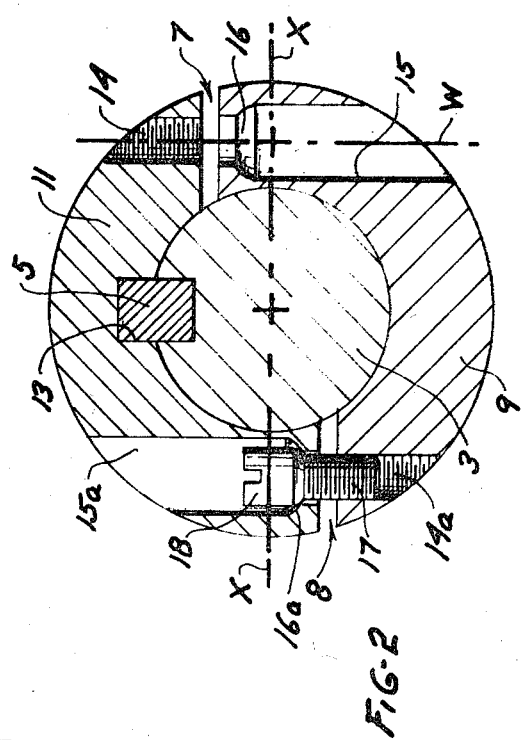
INVENTOR.
LEROY R. BOGGS
BY
ATTORNEYS United States Patent Office 3,554,589
Patented Jan. 12, 1971

3,554,589
SHAFT ALIGNMENT COUPLING
Le Roy R. Boggs, 313 Lynwood St.,
Bristol, Tenn. 37620
Filed May 23, 1969, Ser. No. 827,312
Int. Cl. F16d 1/12
U.S. Cl. 287—111
4 Claims

ABSTRACT OF THE DISCLOSURE

A shaft alignment coupling for use with shafts having keys for establishing the angular shaft position, the coupling incorporating a coupling member common to the two end portions of the two shafts to be coupled and further including separate coupling parts for respectively receiving the two end portions of the shafts, the separate parts having keyways adapted to cooperate with shaft keys, and means for securing the separate parts of the coupling to the common coupling member including means providing for adjustment of at least one of said separate coupling parts with respect to the common coupling member in a direction circumferentially of the associated shaft.

---

This invention relates to shaft couplings and is particularly concerned with a coupling adapted for use in the coupling of adjacent ends of aligned shafts. The invention, moreover, is especially adapted to the coupling of such shafts having keys for establishing the rotative or angular position thereof.

In the coupling of such shafts, for example where the shafts comprise interconnections between gearing, transmission, or other rotative machinery parts, it is desirable to provide for relative angular adjustment of the two end portions of the shafts being coupled.

One of the major objectives of the present invention is to provide an alignment coupling for shafts providing for precise and positive relative angular adjustment of the shafts within a small angular range.

It is a further object of the invention to provide a coupling of the kind just referred to which is of simple form and yet rugged construction.

How the foregoing objects and advantages are attained, together with others which will occur to those skilled in the art will appear more fully from the following description referring to the accompanying drawing, in which:

FIG. 1 is an elevational view of a coupling constructed according to the present invention, this view illustrating the coupling as applied to the adjacent aligned ends of a pair of shafts; and FIG. 2 is a transverse sectional view through the coupling taken as indicated by the section line 2—2 on FIG. 1.

In FIG. 1 the end portions of a pair of aligned shafts are indicated at 3 and 4, each of these shafts having a key 5 and 6. As will be seen the end portions of the shafts are received within the coupling as viewed in FIG. 1.

In the following description of the coupling reference is made to the preferred method for making the coupling parts, because this will clarify various structural features of the coupling itself.

The coupling is desirably formed from a cylindrical piece having an inside diameter adapted to fit the shafts to be coupled and having a keyway adapted to fit the keys of the shafts to be coupled.

As is illustrated in the drawing, the cylindrical piece or sleeve used to fabricate the coupling is cut as indicated at 7 and 8 at generally diametrically opposite points, these two cuts being parallel to but spaced from an axial reference plane indicated at x—x in FIG. 2. Each of these two cuts has some appreciable width, so that a noticeable amount of metal is removed, as is indicated, and this provides clearance so that the parts of the coupling sleeve thus formed may be moved or adjusted in position with respect to each other angularly about the axis of the shafts being coupled.

The cuts 7 and 8 provide a semi-cylindrical coupling member 9 which, as seen in FIG. 1, is common to the end portions of both of the two shafts.

The other portion of the initial cylinder from which the coupling is being made is then cut in a radial plane as indicated at 10 in FIG. 1, so as to form two axially aligned coupling parts 11 and 12. This portion of the initial cylinder also is provided with an internal groove 13 so that each of the coupling parts 11 and 12 has a keyway adapted to cooperate with the keys 5 and 6 of the shafts as shown in FIG. 1.

It will now be seen that the coupling part 11 cooperates with the shaft 3 and its key 5, whereas the coupling part 12 cooperates with the shaft 4 and its key 6.

The various coupling parts are provided with drilled and tapped holes or bores for receiving fastening screws, the arrangement of which is as follows.

Along one side of each of coupling parts 11 and 12 a series of threaded or tapped holes 14 are provided, each being perpendicular to the plane of the cut 7. In alignment with each of the holes 14 the common coupling member 9 is provided with a bore 15 which is shouldered at 16 to engage and cooperate with headed or cap screws. In FIG. 2 the screw at the righthand side of the figure has been omitted in order to more clearly illustrate the various apertures or bores.

At the opposite side of the coupling similar threaded apertures 14a and bores 15a are provided, but in this case, the bores 15a are formed in the coupling parts 11 and 12 and the threaded apertures 14a are formed in the common coupling member 9. Moreover, at the lefthand side of FIG. 2 it will be seen that one of the fastening screws appears at 17, having a head 18.

With the screws arranged in the manner above referred to it is possible, by loosening the screws at one side of the coupling and tightening those at the other, to change the angular position of the coupling parts 11 or 12 with respect to the common coupling member 9, and since each of the coupling parts has a keyway cooperating with a shaft key, it is possible by this means to relatively angularly adjust the positions of the two shafts being coupled.

For precise and positive action of these adjusting screws, without imposing any bending loads upon the screws or parts of the sleeve, it is desirable that the shoulder 16 or 16a in which the head of each screw is seated be concave and preferably substantially spherical. Similarly, either the underside of the head of the screw itself, or an intervening washer should be provided with a spherical surface adapted to cooperate with the spherical seat 16 or 16a. The reduced part of the bore 15 or 15a for receiving the portion of the shank of the screw immediately below the screw head should be slightly oversize so as not to bind upon the screw when an angular adjustment is made.

For most precise action, the radius on which the spherical surface of the seats 16 and 16a for the screw heads is formed should be as follows:

When the parts are assembled in the neutral position as in FIG. 2, the center point of the spherical seats 16 and 16a should coincide with the point of intersection of the two perpendicular lines, namely:

(a) The screw hole center line W, and
(b) A radial line through the center of the shaft x—x.

The reason for this is as follows: Consider that the above described adjustments are to be made on the parts represented in FIG. 2, and further that the shaft 3, key 5 and upper coupling part 11 are fixed relative to the observer, while the lower coupling part 9 is caused to move around the shaft, about its center. Note that the path of movement of the center point of spherical seat 16 would be an arc of a circle, tangent to center line W, at its point of intersection with axis x—x. Note also, that if a screw, such as 17, were assembled in threaded hole 14, and adjusted as described above, the path of movement of the center point of its spherical head would be a straight line along center line W.

Thus, there occurs a mismatch between the path of the screw head and its seat as adjustment is made away from neutral position due to the divergence of the circular arc from its tangent. However, only at the tangent point is the rate of this divergence zero and only by the geometry disclosed herein is this ideal minimum realized.

According to the foregoing a simple, precise, and rugged coupling is provided serving not only to effectively interconnect adjacent end portions of a pair of shafts, such as the drive shafts between power units or power transmission units, and the coupling provides for angular adjustment of one shaft with respect to the other. This may be accomplished by shifting the position of either one or both of the separate coupling parts 11 and 12 in relation to the common coupling member 9.

Although various adjustment devices might be employed for fixing the angularly adjusted relation of the separate parts 11 and 12 with respect to the common member 9, the use of screws in the manner described above is particularly effective, especially where the parts are shaped, drilled and cut in the manner fully described.

I claim:

1. A shaft alignment coupling for use with shafts having keys for establishing the angular shaft position, the coupling comprising a semi-cylindrical coupling member common to and adapted to receive the adjacent end portions of two axially aligned shafts to be coupled, two axially aligned semi-cylindrical coupling parts adapted respectively to receive the end portions of the shafts received in the common coupling member, each of said coupling parts having a keyway for receiving the key of the shaft received therein, the common coupling member and at least one of the coupling parts having circumferential dimensions providing for angular motion of said one coupling part with respect to the common coupling member and means for connecting the coupling parts with the common coupling member including means for adjustably fixing at least one of the coupling parts in different angular positions with respect to the other coupling part and thereby provide for relative angular adjustment of the two coupled shafts.

2. A coupling as defined in claim 1 in which the means for connecting at least one of the coupling parts to the common coupling member includes at least a pair of headed screws cooperating with said part and said member at opposite sides of the coupling.

3. A coupling as defined in claim 2 in which one of the screws is threaded in the common coupling member and has its head seated in the coupling part and in which the other screw is threaded into the coupling part and has its head seated in the common coupling member.

4. A coupling as defined in claim 2 in which the heads of the screws and the head seats therefor are semi-spherical and provide for head seating with the coupling part and the common coupling member in various angularly adjusted positions.

References Cited
UNITED STATES PATENTS

| | | | |
|---|---|---|---|
| 1,363,140 | 12/1920 | Merritt | 287—110 |
| 1,568,101 | 1/1926 | Taylor | 287—118 UX |
| 2,133,050 | 10/1938 | Simmons | 287—111 |
| 3,239,896 | 3/1966 | Thompson | 287—111 |

DAVID J. WILLIAMOWSKY, Primary Examiner

W. L. SHEDD, Assistant Examiner